United States Patent
Vu et al.

(10) Patent No.: US 11,112,490 B2
(45) Date of Patent: Sep. 7, 2021

(54) APPARATUS FOR JOINT CALIBRATION OF RADAR AND CAMERA SYSTEMS FOR AUTONOMOUS VEHICLE APPLICATIONS

(71) Applicant: Argo AI, LLC, Pittsburgh, PA (US)

(72) Inventors: Duc Vu, Sunnyvale, CA (US); Dikpal Reddy, Palo Alto, CA (US); Cole Hartman, Oakland, CA (US)

(73) Assignee: Argo AI, LLC, Pittsburgh, PA (US)

( * ) Notice: Subject to any disclaimer, the term of this patent is extended or adjusted under 35 U.S.C. 154(b) by 308 days.

(21) Appl. No.: 16/383,829

(22) Filed: Apr. 15, 2019

(65) Prior Publication Data

US 2020/0326410 A1 Oct. 15, 2020

(51) Int. Cl.
| | |
|---|---|
| *G01S 7/40* | (2006.01) |
| *B60R 11/04* | (2006.01) |
| *G05D 1/02* | (2020.01) |
| *G01S 13/86* | (2006.01) |
| *G01S 13/931* | (2020.01) |
| *G01S 17/931* | (2020.01) |

(52) U.S. Cl.
CPC ............... *G01S 7/40* (2013.01); *B60R 11/04* (2013.01); *G01S 13/865* (2013.01); *G01S 13/867* (2013.01); *G01S 13/931* (2013.01); *G01S 17/931* (2020.01); *G05D 1/0248* (2013.01); *G05D 1/0257* (2013.01)

(58) Field of Classification Search
CPC ........ G01S 7/40; G01S 7/4026; G01S 13/931; G01S 13/865; G01S 13/867; H01Q 15/14; H01Q 15/18; H01Q 15/20; H01Q 19/106; H01Q 1/3233
See application file for complete search history.

(56) References Cited

U.S. PATENT DOCUMENTS

| | | | | | |
|---|---|---|---|---|---|
| 2,746,035 | A | * | 5/1956 | Norwood | H01Q 15/18 342/7 |
| 3,126,544 | A | * | 3/1964 | Greatbatch, Jr. | G01S 7/38 342/9 |
| 3,167,769 | A | * | 1/1965 | Boyer | H01Q 15/0013 342/5 |
| 3,365,790 | A | * | 1/1968 | Brauer | G02B 5/124 29/600 |

(Continued)

FOREIGN PATENT DOCUMENTS

| | | |
|---|---|---|
| CN | 103983961 A | 8/2014 |
| CN | 107656259 A | 2/2018 |

OTHER PUBLICATIONS

Bjorn J. Doring et al., "TerraSAR-X Calibration Ground Equipment Wave Propagation in Communication," Microwaves Systems and Navigation (WFMN), Jun. 30, 2007, [retrieved on Jun. 28, 2020], Retrieved from <ResearchGate, https://www.researchgate.net/publication/224987078_TerraSAR-X_Calibration_Ground_Equipment> sections I-II and figures 1-2.

*Primary Examiner* — Peter M Bythrow
(74) *Attorney, Agent, or Firm* — Fox Rothschild LLP

(57) ABSTRACT

An apparatus and method for joint calibration of vision and radar sensors for an autonomous device is disclosed. The apparatus may include a spherical portion and a cutout portion. The cutout portion may be formed within the spherical portion and have three equal surfaces. Additionally, the apparatus may include a trihedral reflector positioned within the cutout portion.

22 Claims, 5 Drawing Sheets

(56) References Cited

U.S. PATENT DOCUMENTS

| | | | | |
|---|---|---|---|---|
| 3,965,234 A * | 6/1976 | Lane, Jr. | B29C 41/20 264/275 |
| 4,120,259 A * | 10/1978 | Wilson | F41J 2/00 116/210 |
| 4,176,355 A * | 11/1979 | Harris | H01Q 15/18 342/7 |
| 4,503,101 A * | 3/1985 | Bennett | A47G 33/08 273/348 |
| 4,531,128 A * | 7/1985 | Mensa | H01Q 15/18 342/7 |
| 4,642,469 A * | 2/1987 | Bretaudeau | F41G 7/26 250/559.31 |
| 4,673,934 A * | 6/1987 | Gentry | H01Q 1/081 342/8 |
| 4,733,236 A * | 3/1988 | Matosian | H01Q 15/18 342/169 |
| 4,740,056 A * | 4/1988 | Bennett | H01Q 15/20 342/8 |
| 5,212,488 A * | 5/1993 | Konotchick | G01S 7/38 342/1 |
| 5,699,048 A * | 12/1997 | Galloway | G01V 15/00 340/572.5 |
| 5,953,159 A * | 9/1999 | Shellans | G01S 13/767 359/526 |
| 6,061,012 A * | 5/2000 | Sakimura | H01Q 1/1235 342/10 |
| 6,300,893 B1 * | 10/2001 | Schaff | H01Q 1/081 342/10 |
| 6,542,840 B2 | 4/2003 | Okamoto et al. | |
| 6,864,824 B2 * | 3/2005 | Garon | H01Q 15/20 342/10 |
| 6,915,228 B2 | 7/2005 | Uffenkamp et al. | |
| 7,400,287 B2 * | 7/2008 | Saccomanno | H01Q 15/145 244/3.1 |
| 7,847,721 B1 * | 12/2010 | Carlsson | G01S 7/38 342/6 |
| 8,918,302 B2 | 12/2014 | Hukkeri et al. | |
| 9,147,940 B2 * | 9/2015 | Yahagi | F41J 9/08 |
| 9,160,078 B2 * | 10/2015 | Yahagi | F41J 2/00 |
| 9,279,882 B2 * | 3/2016 | Hukkeri | G01S 7/52004 |
| 10,014,587 B1 * | 7/2018 | Boulais | H01Q 15/145 |
| 10,026,239 B2 | 7/2018 | Kim et al. | |
| 10,476,611 B2 * | 11/2019 | Rowell | H01Q 15/14 |
| 10,785,474 B1 * | 9/2020 | Semansky | G06T 7/80 |
| 2004/0080447 A1 * | 4/2004 | Bas | H01Q 15/141 342/5 |
| 2006/0164295 A1 * | 7/2006 | Focke | G01S 13/867 342/174 |
| 2011/0216411 A1 * | 9/2011 | Reed | B29D 11/00605 359/530 |
| 2012/0320190 A1 * | 12/2012 | Natroshvili | G06T 7/85 348/135 |
| 2013/0009801 A1 * | 1/2013 | Carlsson | G01S 7/38 342/8 |
| 2013/0300594 A1 * | 11/2013 | Rard | H01Q 15/18 342/7 |
| 2016/0161602 A1 * | 6/2016 | Prokhorov | G01S 7/4026 702/97 |
| 2017/0085771 A1 | 3/2017 | Schwager et al. | |
| 2018/0252798 A1 | 9/2018 | Bilik et al. | |
| 2018/0372841 A1 * | 12/2018 | Hieida | G01S 7/40 |
| 2019/0120955 A1 * | 4/2019 | Zhong | G01S 13/584 |

\* cited by examiner

APPARATUS FOR JOINT CALIBRATION OF RADAR AND CAMERA SYSTEMS FOR AUTONOMOUS VEHICLE APPLICATIONS

BACKGROUND

Accurate and consistent obstacle detection and navigation are key elements of autonomous driving applications. Typically, an autonomous vehicle utilizes various on-board sensors to detect obstacles, other aspects of the roadway, and/or other aspects of an environment around the vehicle. Examples of such sensors include, for example, one or more of vision sensors (e.g., camera(s)), radio detection and ranging (i.e., radar) sensors, and/or light detection and ranging (i.e., LiDAR) sensors. While it is possible for only one type of sensor to be utilized, it is far more preferable to fuse data from different types of sensors so as to provide the autonomous vehicle's control systems with more accurate, complete, and dependable information.

In order for sensor fusion to provide desired outputs, the individual sensors must be calibrated prior to usage of the autonomous vehicle and, over time, recalibrated to assure accurate results. In the past, each sensor modality has been calibrated separately, often using separate calibration targets optimized for each modality. Due to the low-resolution, high-variance nature of radar, radar calibration tolerances are much larger than those of other modalities. When fusion of low-level sensor data is desired, the larger variance nature of radar may lead to a mismatch in detection pairing with other sensor types, such as vision sensors. Thus, in order to utilize low-level sensor data for pairing, radar and vision sensors should ideally be calibrated simultaneously using a common target. However, vision sensor calibration in autonomous vehicles has often relied upon the use of a large, planar checkerboard pattern as the calibration target. These large checkerboard patterns are not suitable for calibration of radar sensors, as they result in a high variance radar signature and may create multipath patterns, leading to inaccurate calibration of the radar sensors.

Accordingly, there is a need for a calibration target capable of simultaneously providing both radar and vision sensor calibration without interfering with the other's sensing modality. This document describes systems that are directed to addressing the problems described above, and/or other issues.

SUMMARY

In accordance with an aspect of the disclosure, an apparatus for joint calibration of vision and radar sensors for an autonomous device is disclosed. The apparatus may include a spherical portion and a cutout portion. The cutout portion may be formed within the spherical portion and have three equal surfaces. Additionally, the apparatus may include a trihedral reflector positioned within the cutout portion.

According to another aspect of the disclosure, a system for joint calibration of vision and radar sensors is disclosed. The system may include an autonomous device having at least one camera sensor and at least one radar sensor. The system may further include a calibration target. The calibration target may include a spherical portion and a cutout portion. The cutout portion may be formed within the spherical portion and may include three surfaces. Additionally, the calibration target may include a trihedral reflector positioned within the cutout portion.

In accordance with another aspect of the disclosure, a method of forming a calibration target for the joint calibration of vision and radar sensors for an autonomous device is disclosed. The method may include forming a spherical portion, and forming a cutout portion within the spherical portion. The cutout portion may be formed so as to include three surfaces of equal size and shape. Additionally, the method may include providing a metallic trihedral reflector positioned within the cutout portion.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
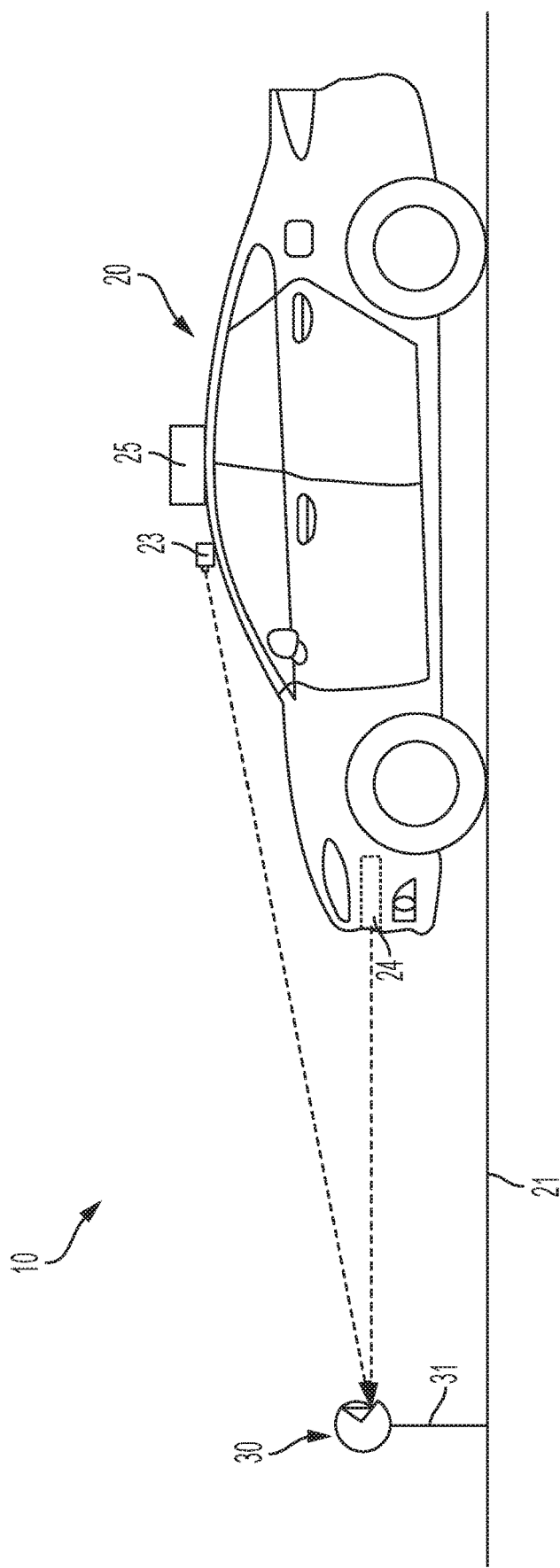
FIG. 1 illustrates a calibration system for an autonomous device in accordance with an aspect of the disclosure.

Referring to FIG. 1, an autonomous vehicle calibration system 10 in accordance with an aspect of the disclosure is shown. Calibration system 10 includes an autonomous vehicle 20, which may capable of fully-autonomous or semi-autonomous operation. While illustrated as a conventional passenger car, it is to be understood that autonomous vehicle 20 may be configured as any appropriate automated device, e.g., a car, truck, van, train, aircraft, aerial drone and the like.

Autonomous vehicle 20 includes a plurality of sensor types used in the gathering of information used in vehicle navigation, obstacle avoidance, etc. Specifically, one or more cameras 23 may be provided, as well as one or more radar sensors 24. Additionally, in some embodiments, one or more LiDAR sensors 25 may also be present. While not shown in FIG. 1, it is to be understood that the camera(s) 23, radar sensor(s) 24, and/or LiDAR sensor(s) 25 are electrically coupled to an on-board processor configured to perform calculations and logic operations required to execute programming instructions. In this way, data from the camera(s) 23, radar sensor(s) 24, and/or LiDAR sensor(s) 25 may be combined so as to provide the autonomous vehicle's control systems with more accurate, complete, and dependable information.

Calibration system 10 also includes a calibration target 30. As will be described in further detail below, calibration target 30 is configured as a single target capable of providing joint calibration of the camera(s) 23 and radar sensor(s) 24. Calibration target 30 may be mounted upon a post 31 or other structure capable of elevating calibration target 30 above the ground surface 21 and in the field-of-view of both the camera(s) 23 and radar sensor(s) 24. However, it is to be understood that calibration target 30 may be elevated above the ground surface 21 using any appropriate means and/or at any appropriate height. Furthermore, in some embodiments, during a calibration process, the autonomous vehicle 20 may be positioned such that both the camera(s) 23 and radar sensor(s) 24 are positioned at a distance of 4-to-6 meters away from the calibration target 30. However, it is to be understood that the distance between the camera(s) 23 and radar sensor(s) 24 is not limited to 4-to-6 meters, and the calibration target 30 may vary based on, e.g., the size of the calibration target 30, the position of the calibration target 30, the positions of the camera(s) 23 and radar sensor(s) 24 on the autonomous vehicle 20, etc.

Figure 2:
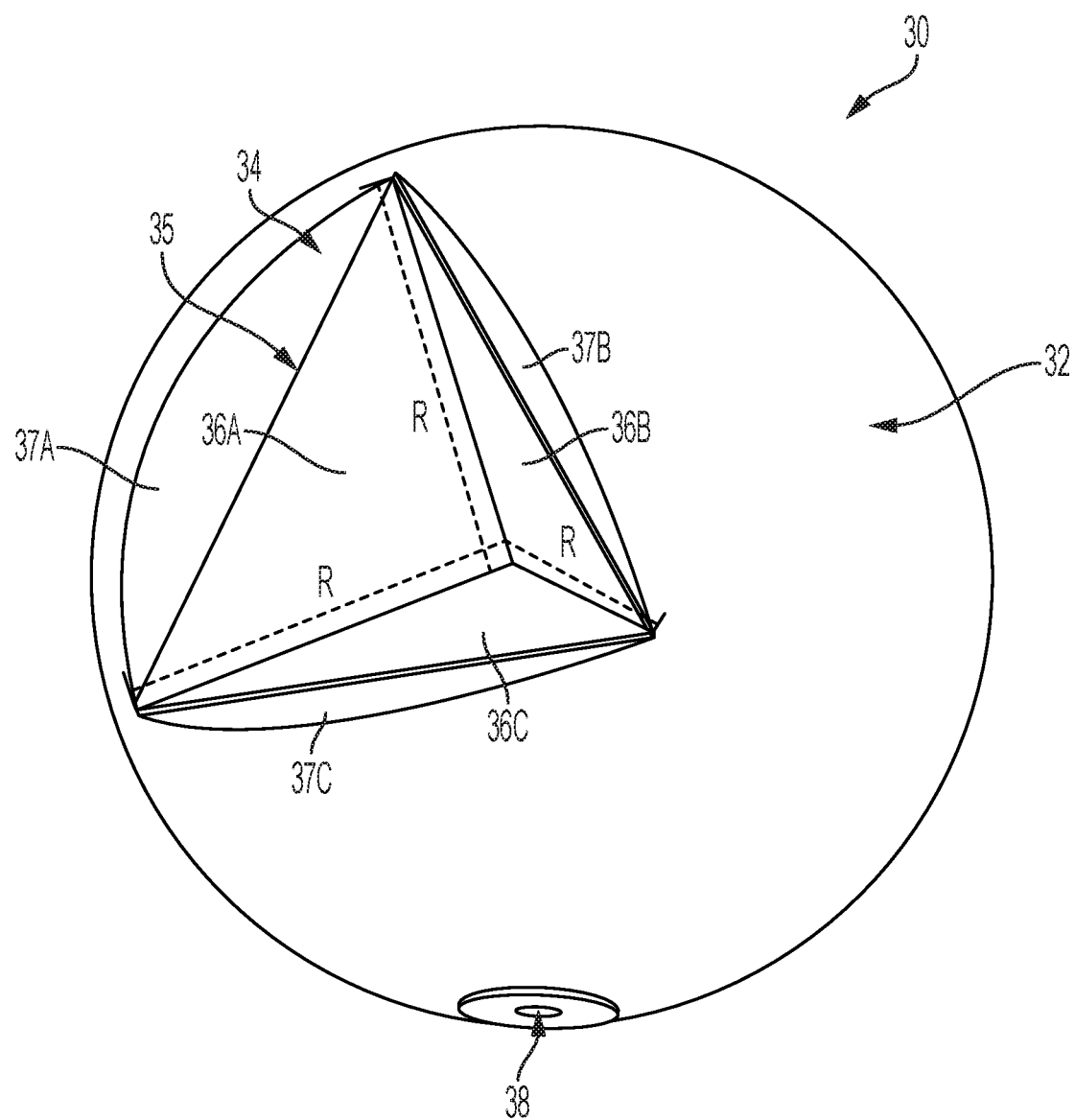
FIG. 2 illustrates a perspective view of a calibration target for use in vision sensor and radar sensor calibration in accordance with an aspect of the disclosure.

Next, referring to FIG. 2, a detailed view of calibration target 30 in accordance with an aspect of the disclosure is shown. As noted above, calibration target 30 is configured as a single target capable of aiding the calibration of both vision and radar sensors. First, calibration target 30 includes a substantially spherical portion 32, which may be formed of one or more appropriate non-metallic material(s) having a low radar signature (e.g., less than 0 dB/m$^2$). Such appropriate non-metallic material(s) may be, e.g., polystyrene, polypropylene, polyvinyl chloride (PVC), polyamide, polycarbonate (PC), polycarbonate and polybutylene terephthalate blend (PC-PBT), acrylonitrile butadiene styrene (ABS), acrylonitrile styrene acrylate (ASA), etc. Additionally, spherical portion 32 is visually opaque, may be painted or otherwise colored, and may have any suitable diameter, such as, e.g., 12 inches. In this way, spherical portion 32 provides for an ideal target for the calibration of camera(s) 23, as the spherical shape and/or colored surface enables a low-variance vision angle and range estimate for the camera(s) 23. Additionally, the spherical portion 32 does not interfere in any substantial respect with returns from the radar sensor(s) 24, as the material (e.g., polystyrene, PVC, PC, etc.) has a low radar signature, and the spherical shape and relatively small diameter resists reflection of the electromagnetic waves from the radar sensor(s) 24.

Within substantially spherical portion 32 is a cutout portion 34, with cutout portion 34 accounting for approximately ⅛ of the overall volume of the calibration target 30. A trihedral reflector 35 is provided within the cutout portion 34, wherein the trihedral reflector 35 acts as a corner reflector capable of generating a strong radar echo for use in calibration of the radar sensor(s) 24. More specifically, the trihedral reflector 35 includes three electrically-conductive surfaces 36A, 36B, 36C mounted at a 90° angle relative to one another, allowing incoming electromagnetic waves from the radar sensor(s) 24 shown in FIG. 1 to be accurately backscattered in the direction from which they came.

Accordingly, even with a relatively small size, the trihedral reflector 35 provides a strong radar echo, particularly when compared with other surfaces (e.g., spheres, planar surfaces, etc.) of similar size. For example, a trihedral reflector 35 in which the length R of each opposite and adjacent side of triangular surfaces 36A, 36B, 36C is approximately 6 inches may provide for a stable 20 dB/m$^2$ radar signal, thereby allowing for low-variance angle detection and a large radar field-of-view, particularly given the relatively small overall size of the trihedral reflector 35. Additionally, the cutout portion 34 and trihedral reflector 35 sized and positioned such that they do not greatly interfere with the ability of the camera(s) 23 to calibrate using the spherical portion 32.

Referring still to FIG. 2, the trihedral reflector 35 is shown as an insert secured within the cutout portion 34. In some embodiments, trihedral reflector 35 is a solid metallic insert, preformed and then placed into (i.e., completely embedded within) cutout portion 34, leaving portions of the internal surfaces 37A, 37B, 37C of the cutout portion 34 uncovered. Each triangular surface 36A, 36B, 36C may be of equal size and shape.

Figure 3:
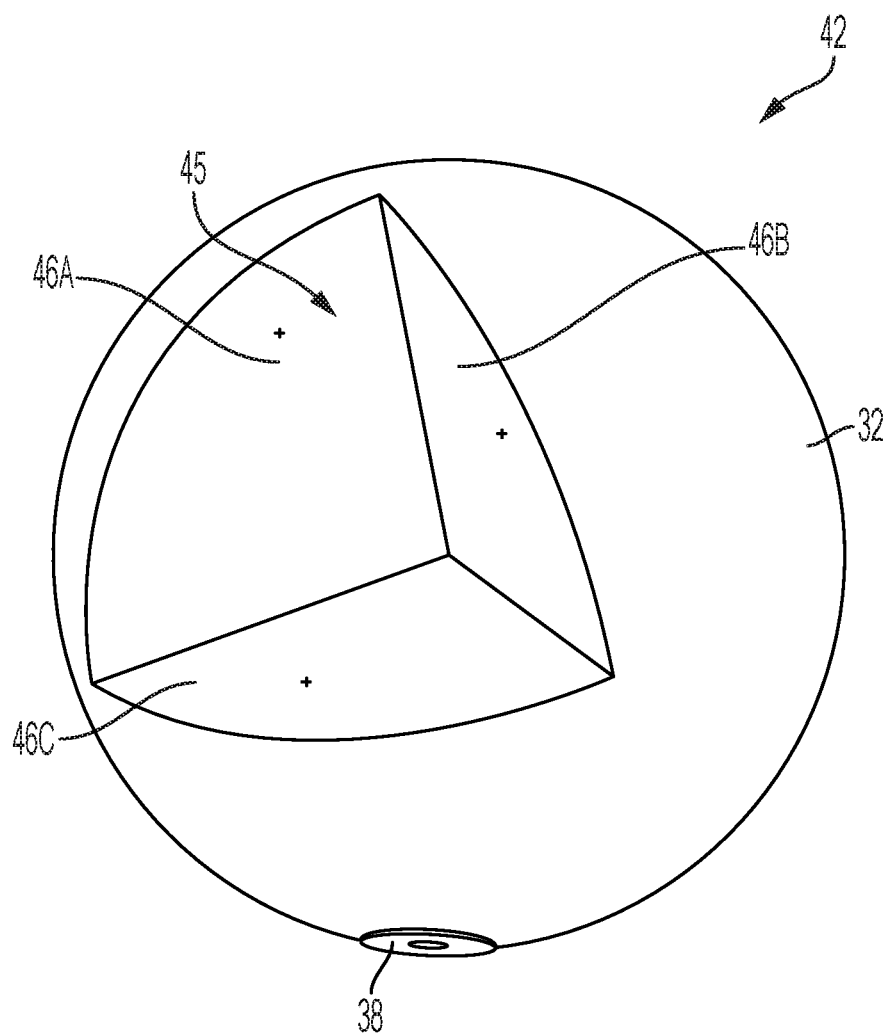
FIG. 3 illustrates a perspective view of a calibration target for use in vision sensor and radar sensor calibration in accordance with another aspect of the disclosure.

However, as shown in FIG. 3, and in accordance with another aspect of the disclosure, it is to be understood that the trihedral reflector may instead be formed of a metallic coating applied to the internal surfaces of the cutout portion 34, thereby leaving no surfaces of the cutout portion 34 uncovered. Specifically, referring to FIG. 3, a calibration target 42 in accordance with one embodiment is shown, with the cutout portion of spherical portion 32 having metallically coated surfaces 46A, 46B, 46C to form a trihedral reflector 45. The metallic coating may be applied via any appropriate method, such as spray coating, adhesive coating, etc. The thickness of each surface 46A, 46B, 46C of the trihedral reflector 45 may be any appropriate thickness (e.g., about 50 microns) capable of the reflection of electromagnetic waves. Furthermore, each surface 46A, 46B, 46C should be non-porous, thereby allowing for accurate backscatter of the electromagnetic waves.

Referring again to FIG. 2, while the length R of each opposite and adjacent side of triangular surfaces 36A, 36B, 36C is described above as being 6 inches (i.e., equal to the radius of the spherical portion 32), it is to be understood that the length of each surface 36A, 36B, 36C may be longer or shorter. In such an instance, the change x-y-z position of each surface 36A, 36B, 36C relative to the sphere center would need to be accounted for such that the calibration of the radar sensor(s) and the calibration of the camera(s) remains consistent.

Figure 4:
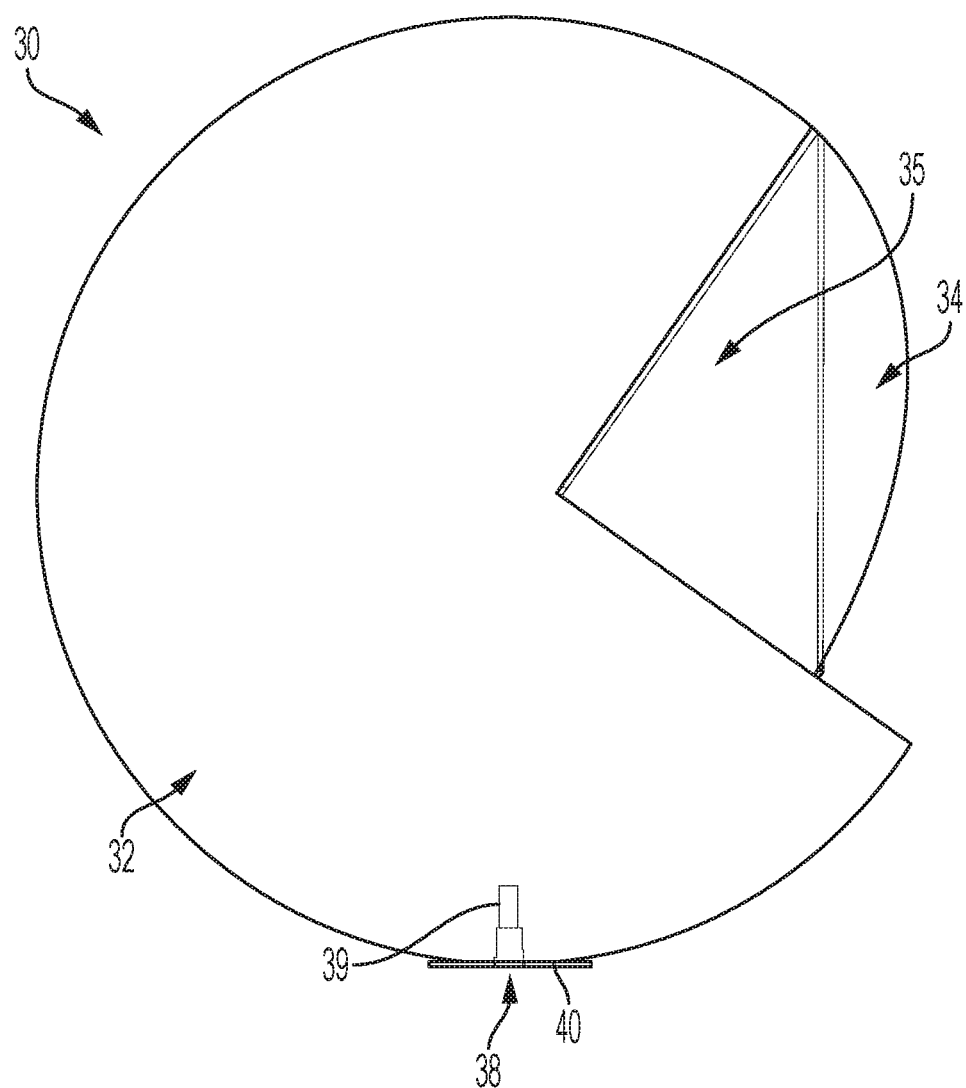
FIG. 4 illustrates a cross-sectional view of the calibration target of FIG. 2.
Figure 5:
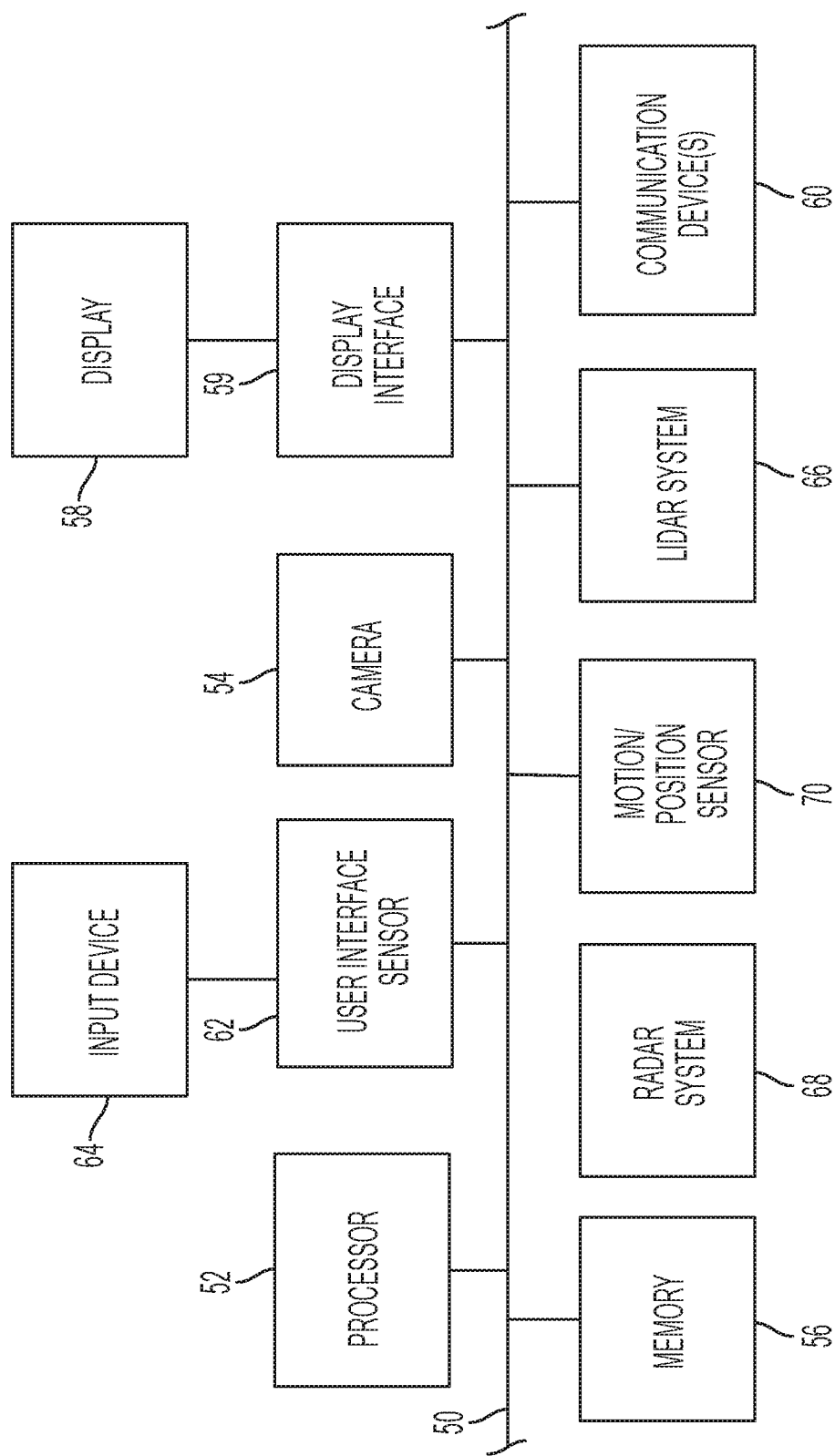
FIG. 5 is a block diagram of elements of a computing device on which the various systems and methods in this document could be implemented.

Next, referring to both FIG. 2 and FIG. 4, calibration target 30 further includes a base member 38, which allows calibration target 30 to be mounted in a desired location (e.g., upon post 31, as shown in FIG. 1). As shown in FIG. 3, base member 38 may include an inwardly-directed stem portion 39, along with a circular face portion 40, wherein the stem portion 39 is configured to extend within the spherical portion 32 so as to secure the base member 38 and allow for coupling at a mounting location. In some embodiments, the base member 38 is formed of a material (or materials) which have a low radar signal, such as, e.g., polypropylene, polyamide, PVC, PC, PC-PBT, ABS, ASA, etc. In this way, the base member 38 is essentially transparent to the radar signal and does not alter the calibration of the radar sensor(s). At the very least, the radar signal of the base member 38 should be low enough that it is essentially rendered moot relative to the high radar signal provided by the trihedral reflector 35.

Additionally, in accordance with another aspect of the disclosure, the trihedral reflectors 35, 45 shown and described above with respect to FIGS. 2-4 may be angularly positioned within a cutout of the spherical portion 32 relative to the base member 38 such that each surface of the trihedral reflector 35, 45 has equal exposure from a line-of-sight aligned with the shared corner of the three surfaces and parallel to the ground, similar to that which is shown in FIG. 1. With such a configuration, the calibration target may be more tolerant of misalignment during calibration set-up.

FIG. 4 depicts an example of internal hardware that may be included in any of the electronic components of the calibration system, such as internal processing systems, external monitoring and reporting systems, or remote servers. An electrical bus 50 serves as an information highway interconnecting the other illustrated components of the hardware. Processor 52 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 56. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 59 may permit information from the bus 50 to be displayed on a display device 58 in visual, graphic or alphanumeric format. An audio interface and audio output (such as a speaker) also may be provided. Communication with external devices may occur using various communication devices 60 such as a wireless antenna, an RFID tag and/or short-range or near-field communication transceiver, each of which may optionally communicatively connect with other components of the device via one or more communication system. The communication device(s) 60 may be configured to be communicatively connected to a communications network, such as the Internet, a local area network or a cellular telephone data network.

The hardware may also include a user interface sensor 62 that allows for receipt of data from input devices 64 such as a keyboard, a mouse, a joystick, a touchscreen, a touch pad, a remote control, a pointing device and/or microphone. Digital image frames also may be received from one or more cameras 54 that can capture video and/or still images. The system also may receive data from a motion and/or position sensor 70 such as an accelerometer, gyroscope or inertial measurement unit. The system also may receive data from a radar system 68 and/or a LiDAR system 66 such as that which was described above.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes;

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

What is claimed is:

1. A joint sensor calibration target comprising:
    a spherical portion;
    a cutout portion, wherein the cutout portion is formed within the spherical portion and comprises three equal surfaces; and
    a trihedral reflector positioned within the cutout portion.
2. The joint sensor calibration target of claim 1, wherein the spherical portion comprises one or more non-metallic materials.
3. The joint sensor calibration target of claim 2, wherein the material is one or more of polystyrene, polypropylene, polyvinyl chloride (PVC), polyamide, polycarbonate (PC), polycarbonate and polybutylene terephthalate blend (PC-PBT), acrylonitrile butadiene styrene (ABS), and acrylonitrile styrene acrylate (ASA).
4. The joint sensor calibration target of claim 1, wherein the spherical portion is visually opaque.
5. The joint sensor calibration target of claim 1, wherein the trihedral reflector comprises a metallic material.
6. The joint sensor calibration target of claim 5, wherein the trihedral reflector comprises a preformed metallic insert having three surfaces of equal size and shape.
7. The joint sensor calibration target of claim 5, wherein the trihedral reflector comprises a metallic coating applied to the three surfaces of the cutout portion.
8. The joint sensor calibration target of claim 1, wherein a volume of the cutout portion is ⅛ of a volume of spherical portion.
9. The joint sensor calibration target of claim 1, wherein a length of each opposite and adjacent side of each triangular surface of the trihedral reflector is equal to the radius of the spherical portion.
10. The joint sensor calibration target of claim 1, further comprising a base portion coupled to the spherical portion.
11. The joint sensor calibration target of claim 10, wherein the base portion comprises one or more of a polystyrene, polypropylene, polyvinyl chloride (PVC), polyamide, polycarbonate (PC), polycarbonate and polybutylene terephthalate blend (PC-PBT), acrylonitrile butadiene styrene (ABS), or acrylonitrile styrene acrylate (ASA) material.
12. A system for joint calibration of vision and radar sensors comprising:
    an autonomous device having at least one camera sensor and at least one radar sensor; and
    a calibration target configured to aid calibration of the at least one camera sensor and the at least one radar sensor simultaneously, wherein the calibration target comprises:
    a spherical portion;
    a cutout portion, wherein the cutout portion is formed within the spherical portion and comprises three surfaces; and
    a trihedral reflector positioned within the cutout portion.
13. The system of claim 12, wherein the autonomous device comprises an autonomous vehicle.

14. The system of claim 12, wherein the spherical portion of the calibration target is formed of one or more of a polystyrene, polypropylene, polyvinyl chloride (PVC), polyamide, polycarbonate (PC), polycarbonate and polybutylene terephthalate blend (PC-PBT), acrylonitrile butadiene styrene (ABS), or acrylonitrile styrene acrylate (ASA) material.

15. The system of claim 12, wherein the trihedral reflector of the calibration target comprises a metallic material.

16. The system of claim 15, wherein the trihedral reflector of the calibration target comprises a preformed metallic insert having three surfaces of equal size and shape.

17. The system of claim 15, wherein the trihedral reflector of the calibration target comprises a metallic coating applied to the three surfaces of the cutout portion.

18. A method of forming a calibration target for the joint calibration of vision and radar sensors for an autonomous device, the method comprising:

forming a spherical portion;
forming a cutout portion within the spherical portion, wherein the cutout portion is formed so as to comprise three surfaces of equal size and shape; and
providing a metallic trihedral reflector positioned within the cutout portion.

19. The method of claim 18, wherein forming the spherical portion comprises forming the spherical portion from one or more of a polystyrene, polypropylene, polyvinyl chloride (PVC), polyamide, polycarbonate (PC), polycarbonate and polybutylene terephthalate blend (PC-PBT), acrylonitrile butadiene styrene (ABS), or acrylonitrile styrene acrylate (ASA) material.

20. The method of claim 18, wherein forming the cutout portion comprises removing a portion of the spherical portion equal to ⅛ of the volume of spherical portion.

21. The joint sensor calibration target of claim 1, wherein the spherical portion is configured to have a fixed diameter.

22. The method of claim 18, wherein the spherical portion is configured to have a fixed diameter.

* * * * *